United States Patent
Cadix

(10) Patent No.: US 10,550,313 B2
(45) Date of Patent: Feb. 4, 2020

(54) VISCOSIFIER AGENT FOR OILFIELD FLUIDS IN HARD CONDITIONS

(71) Applicant: RHODIA OPERATIONS, Paris (FR)

(72) Inventor: Arnaud Cadix, Saint-ouen (FR)

(73) Assignee: RHODIA OPERATIONS, Paris (FR)

( * ) Notice: Subject to any disclaimer, the term of this patent is extended or adjusted under 35 U.S.C. 154(b) by 14 days.

(21) Appl. No.: 15/028,172

(22) PCT Filed: Oct. 15, 2014

(86) PCT No.: PCT/EP2014/072145
§ 371 (c)(1),
(2) Date: Apr. 8, 2016

(87) PCT Pub. No.: WO2015/055730
PCT Pub. Date: Apr. 23, 2015

(65) Prior Publication Data
US 2016/0257873 A1    Sep. 8, 2016

Related U.S. Application Data

(60) Provisional application No. 61/891,638, filed on Oct. 16, 2013.

(51) Int. Cl.
*C09K 8/68* (2006.01)
*C09K 8/88* (2006.01)

(52) U.S. Cl.
CPC ............. *C09K 8/685* (2013.01); *C09K 8/882* (2013.01); *C09K 8/887* (2013.01)

(58) Field of Classification Search
CPC .......... C09K 8/685; C09K 8/035; C09K 8/04; C09K 8/508; C09K 8/512; C09K 8/5751; C09K 8/5756; C09K 8/584; C09K 8/604; C09K 8/882; C09K 8/887; C09K 2208/30
USPC ...................................................... 507/225
See application file for complete search history.

(56) References Cited

U.S. PATENT DOCUMENTS

| | | | |
|---|---|---|---|
| 4,631,063 A * | 12/1986 | Stockhausen | C14C 3/28 8/94.2 |
| 7,325,615 B2 | 2/2008 | Kriegel et al. | |
| 2009/0192055 A1 | 7/2009 | Engelhardt et al. | |
| 2009/0255678 A1 * | 10/2009 | Rosine | C02F 9/00 166/305.1 |
| 2009/0264325 A1 | 10/2009 | Atkins et al. | |
| 2010/0093874 A1 * | 4/2010 | Monin | C08F 220/38 514/772.4 |
| 2010/0197530 A1 | 8/2010 | Gupta et al. | |
| 2012/0196776 A1 | 8/2012 | Gupta et al. | |
| 2013/0037267 A1 * | 2/2013 | Regnault de la Mothe | C08F 220/56 166/293 |

FOREIGN PATENT DOCUMENTS

EP    2381065 A1    10/2011

OTHER PUBLICATIONS

Practical Handbook of Marine Science, 2001 CRC Press, Chapter 2, Marine Chemistry (Year: 2001).*
Gauthier, Mario, et al—"Sulfobetaine Zwitterionomers Based on n-Butyl Acrylate and 2-Ethoxyethyl Acrylate: Monomer Synthesis and Copolymerization Behavior", 2002, Journal of Polymer Science: Part A, Polymer Chemistry, vol. 40, John Wiley & Sons, Inc., pp. 511-523.
Koberle, P., et al—"Hydrophobically Modified Zwitterionic Polymers: Synthesis, Bulk Properties, and Miscibility with Inorganic Salts", 1994, Macromolecules, vol. 27, pp. 2165-2173.
Favresse, Philippe, et al—"New poly(carbobetaine)s made from zwitterionic diallylammonium monomers", 1999, Macromol. Chem. Phys., vol. 200, Issue No. 4, Wiley-VCH Verlag GmbH, pp. 887-895.
Lee, Wen-Fu, et al—"Synthesis and solubility of the poly(sulfobetaine)s and the corresponding cationic polymers: 1. Synthesis and characterization of sulfobetaines and the corresponding cationic monomers by nuclear magnetic resonance spectra", 1994, Polymer, vol. 35, Issue No. 10, 2210-2217.
Soto, V. M. Monroy, et al—"Poly(sulphopropylbetaines): 1. Synthesis and characterization", 1984, Polymer, vol. 25, p. 121-128.
Castano, V.M., et al—"Evidence of ionic aggregates in some ampholytic polymers by transmission electron microscopy", 1990, J. Mater. Res., vol. 5, Issue No. 3, pp. 654-657.
Salamone, J.C., et al—"Aqueous solution properties of a poly(vinyl imidazolium sulphobetaine)", 1978, Polymer, vol. 19, pp. 1157-1162.

* cited by examiner

*Primary Examiner* — Aiqun Li

(57) ABSTRACT

The invention relates to a viscosifier useful for oilfield fluids, especially high TDS fluids and heavy brines, comprising:
  at least a zwitterionic polymer, prepared by inverse emulsion polymerization of:
    monomers A comprising a betaine group;
    nonionic monomers B
    monomers C including a metal ion crosslinkable group with a molar ratio of the monomers A to the monomers B between 4/96 and 40/60; and
  at least a metal ion compound leading to the crosslinking of the groups carried by monomers C.

17 Claims, No Drawings

VISCOSIFIER AGENT FOR OILFIELD FLUIDS IN HARD CONDITIONS

This application is a U.S. national stage entry under 35 U.S.C. § 371 of International Patent Application No. PCT/EP2014/072145, filed Oct. 15, 2014, which claims priority to U.S. Patent Application No. 61/891,638, filed on Oct. 16, 2013, the whole content of each of these applications is hereby incorporated herein by reference for all purposes.

The instant disclosure relates to oil field treatment fluids intended to be used with high total dissolved solid (high TDS fluids) or a high content of salts (heavy brines). It more specifically deals with viscosifiers that efficiently control the rheology in such conditions.

In some specific oilfield applications, rheology control is difficult to achieve. That is especially the case with heavy brines used e.g. in ultra-deep wells control for compensating over pressured formations, or with high TDS fluids such as the produced water formed in the scope of fracturing operations made in areas where availability of fresh water is limited.

Natural or synthetic polymers that have been considered for controlling the rheology in such conditions are generally difficult to handle. Especially, high molecular weight polymers solubility is generally limited in high TDS fluids.

Besides, a complete hydration is difficult to achieve and the hydration kinetic can be extremely slow.

In addition, even if initial solubility can be achieved, polymer stability at elevated temperature and performance in rheology control are often disappointing compared to usual fresh water or low salinity brines.

A specific rheology control that is especially difficult to obtain with heavy brines or high TDS fluids is yield stress, which is requested in some oilfield applications, e.g. in fracturing fluids, completion fluids or conformance control fluids. In the case of fracturing fluids, this yield stress prevents the settling of proppant particles and promotes an even placement of proppant along the newly formed fracture. In the case of completion fluid, yield stress is necessary to prevent mixing of successive different fluids being injected in the well or coming from the rock formation.

For obtaining such a yield stress, it has been proposed to make use of polymers crosslinked via metal ion crosslinkers such as a zirconate or titanate that interact with crosslinkable units present on the polymer. For instance, crosslinked polysaccharides especially guars have been described, that show however very limited thermal resistance and very low solubility in high salt concentration fluids or heavy brines. Other examples of crosslinked polymer are described in U.S. Pat. No. 7,325,615 or US2009/0192055.

The crosslinked polymers of this type that have been described today cannot be used in heavy brines, especially if concentrated in multivalent cations. Indeed the multivalent cations induce strong interactions with the crosslinkable units present on the polymer, hence limiting the solubility of the polymer and often leading to precipitation of the polymer instead of gelification of the brine.

One aim of the instant invention is to provide viscosifiers that can be successfully used in high TDS fluids or heavy brines, allow a control of rheology in such fluids, and that is able to impart a yield stress even in heavy brines containing multivalent cations.

To this end, the instant invention provides a viscosifier for oilfield fluids, especially useful in high TDS fluids and heavy brines, comprising:
a zwitterionic and crosslinkable polymer, prepared by inverse emulsion polymerization of:
monomers A comprising a betaine group;
nonionic monomers B
monomers C including a metal ion crosslinkable group
with a molar ratio of the monomers A to the monomers B between 4/96 and 40/60, preferably 7/93 and 30/70,
and a molar ratio C/(A+B) between 0.5 and 15%, preferably between 1 and 12%
a metal ion compound leading to the crosslinking of the groups carried by monomers C (hereinafter referred as the "crosslinker").

According to another aspect, the invention relates to the use of the association of the aforesaid zwitterionic and crosslinkable polymer and metal ion compound for modifying the rheology of an oilfield fluids, for example:
a high TDS fluid (preferably a fluid comprising more than 0.5 mol/L or more than 3% in mass of solid content) or
an heavy brine (preferably a fluid having a ionic force of more than 4 mol/L or more than 20% in mass)

In most cases, the zwitterionic and crosslinkable polymer used in the scope of the instant invention is used as obtained after the inverse emulsion polymerization, namely included in an aqueous phase dispersed in the form of droplets in a hydrophobic external phase.

Besides, the polymer preferably exhibits an intrinsic viscosity of greater than 600 mL/g, preferably of greater than 1000 mL/g, this intrinsic viscosity being calculated from the reduced specific viscosity measured by dissolving the polymer in a 20% by weight aqueous NaCl solution at 25° C.

The viscosifier system used according to the invention (crosslinkable polymer and metal ion crosslinker) allows a control of the rheology of a great number of oilfield fluids. Suprisingly, the inventors have now evidenced that the crosslinking of the polymer via the metal ion crosslinker may be obtained even with a high content of salt, for example in heavy brines. Besides, the polymers of the invention are hydrating even with a high TDS. Due to the presence of the crosslinker, the polymer of the invention not only improve viscosity but show interesting viscosity profiles and yield stress that allow them to be used i.a. in fracturing fluids or completion fluids, or alternatively in conformance control or water shutoff.

More specific embodiments and preferred embodiments of the invention will now be described in more details.

The monomers A Comprising a Betaine Group

The monomers A present in the polymer of the invention, preferably hydrophilic, may especially be selected from the group consisting in the following monomers and their mixtures:
alkylsulphonates or -phosphonates of dialkylammonioalkyl acrylates or methacrylates, -acrylamides or -methacrylamides, carrying betaine groups, such as:
sulphopropyldimethylammonioethyl methacrylate (SPE) of formula:

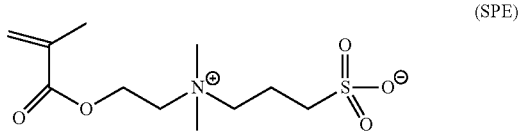 [SMILES: C=C(C)C(=O)OCC[N+](C)(C)CCCS(=O)(=O)[O-]]

(SPE)

for example SPE sold by Raschig
sulphoethyldimethylammonioethyl methacrylate and sulphobutyldimethyl ammonioethyl methacrylate:

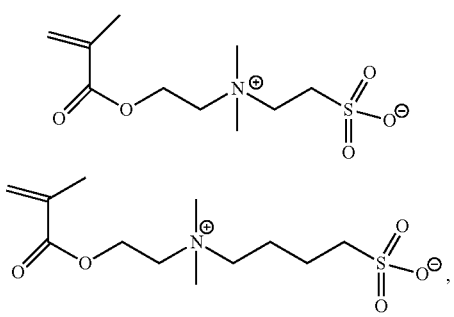

the synthesis of which is described in the paper "Sulfobetaine zwitterionomers based on n-butyl acrylate and 2-ethoxyethyl acrylate: monomer synthesis and copolymerization behavior", Journal of Polymer Science, 40, 511-523 (2002),
sulphohydroxypropyldimethylammonioethyl methacrylate:

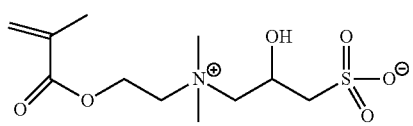
(SHPE)

sulphopropyldimethylammoniopropylacrylamide:

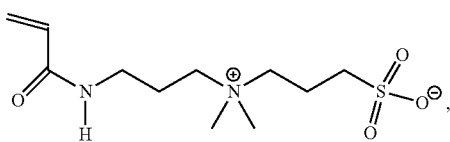 [SMILES: C=CC(=O)NCCC[N+](C)(C)CCCS(=O)(=O)[O-]]

the synthesis of which is described in the paper "Synthesis and solubility of the poly(sulfobetaine)s and the corresponding cationic polymers: 1. Synthesis and characterization of sulfobetaines and the corresponding cationic monomers by nuclear magnetic resonance spectra", Wen-Fu Lee and Chan-Chang Tsai, Polymer, 35 (10), 2210-2217 (1994),
sulphopropyldimethylammoniopropylmethacrylamide, sold by Raschig under the name SPP:

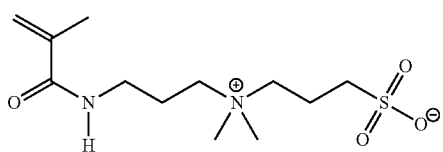
(SPP)

sulphopropyldimethylammonioethyl methacrylate (SPDA):

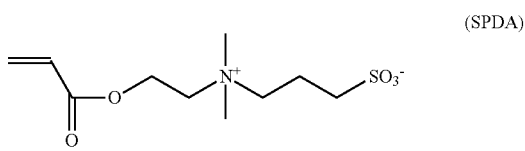
(SPDA)

for example sold by Raschig
sulphohydroxypropyldimethylammoniopropylmethacrylamide:

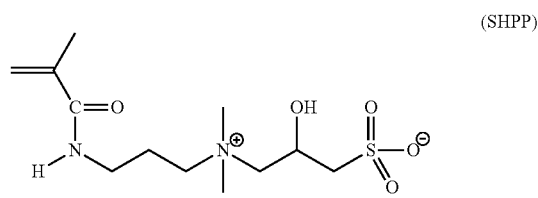 [SMILES: C=C(C)C(=O)NCCC[N+](C)(C)CC(O)CS(=O)(=O)[O-]]
(SHPP)

sulphopropyldiethylammonioethyl methacrylate:

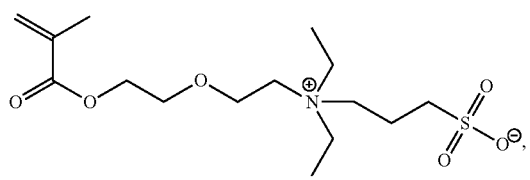 [SMILES: C=C(C)C(=O)OCCOCC[N+](CC)(CC)CCCS(=O)(=O)[O-]]

the synthesis of which is described in the paper "Poly(sulphopropylbetaines): 1. Synthesis and characterization", V. M. Monroy Soto and J. C. Galin, Polymer, 1984, Vol. 25, 121-128,
sulphohydroxypropyldiethylammonioethyl methacrylate:

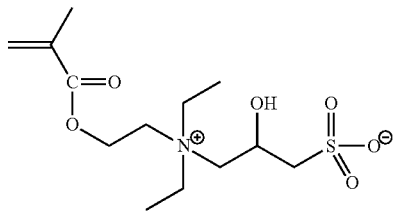 [SMILES: C=C(C)C(=O)OCC[N+](CC)(CC)CC(O)CS(=O)(=O)[O-]]

heterocyclic betaine monomers, such as:
sulphobetaines derived from piperazine, such as:

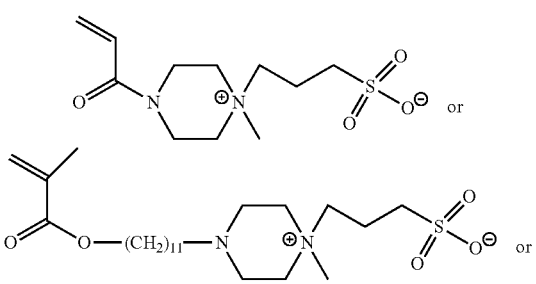

-continued

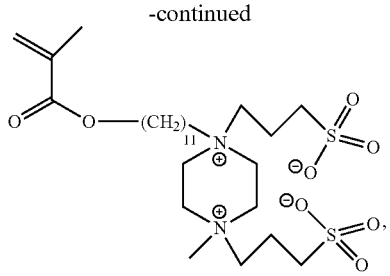

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), sulphobetaines derived from 2-vinylpyridine and 4-vinylpyridine, including i.a.:

2-vinyl-1-(3-sulphopropyl)pyridinium betaine (2SPV or "SPV"), sold by Raschig under the name SPV:

(SPV)

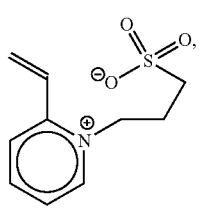

4-vinyl-1-(3-sulphopropyl)pyridinium betaine (4SPV), the synthesis of which is disclosed in the paper "Evidence of ionic aggregates in some ampholytic polymers by transmission electron microscopy", V. M. Castaño and A. E. Gonzáalez, J. Cardoso, O. Manero and V. M. Monroy, J. Mater. Res., 5 (3), 654-657 (1990):

(4SPV)

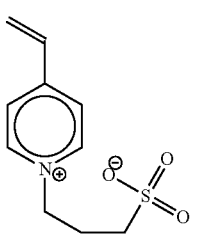

1-vinyl-3-(3-sulphopropyl)imidazolium betaine:

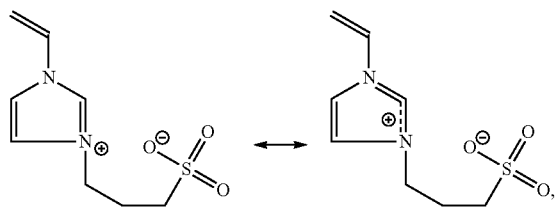

the synthesis of which is described in the paper "Aqueous solution properties of a poly(vinyl imidazolium sulphobetaine)", J. C. Salamone, W. Volkson, A. P. Oison, S. C. Israel, Polymer, 19, 1157-1162 (1978), alkylsulphonates or -phosphonates of dialkylammonioalkylallylics, such as sulphopropylmethyldiallylammonium betaine:

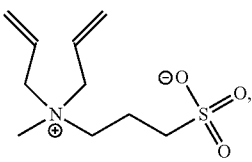

the synthesis of which is described in the paper "New poly(carbobetaine)s made from zwitterionic diallylammonium monomers", Favresse, Philippe; Laschewsky, Andre, Macromolecular Chemistry and Physics, 200(4), 887-895 (1999), alkylsulphonates or -phosphonates of dialkylammonioalkylstyrenes, such as:

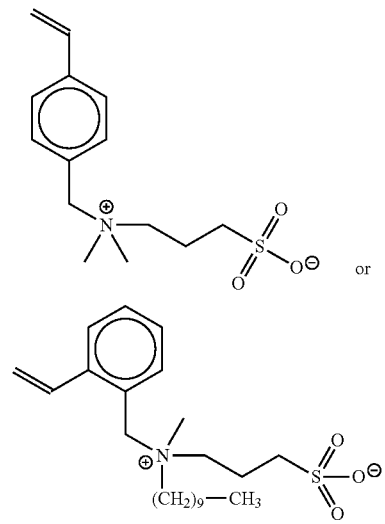

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), betaines resulting from the reaction of ethylenically unsaturated anhydrides and dienes, such as:

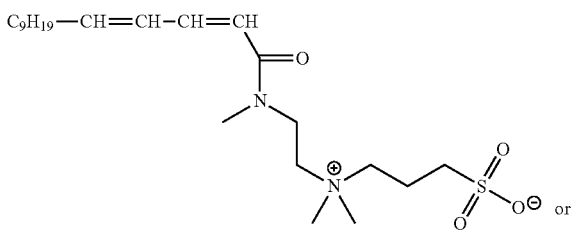

-continued

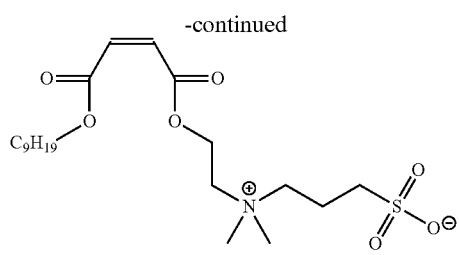

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), phosphobetaines, such as:

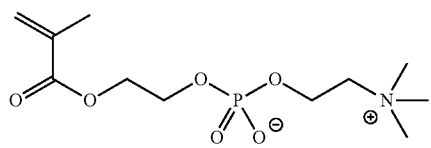
(MPC)

or alternatively:

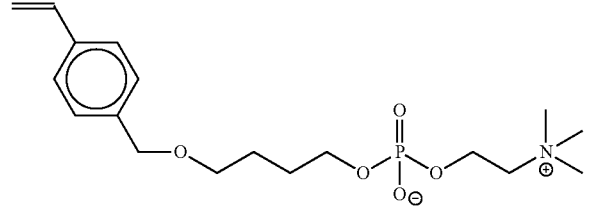
(VPC)

The synthesis of MPC and of VPC is described in EP 810 239 B1 (Biocompatibles, Alister et al.).

Preferred monomers A have one of the following formulae:

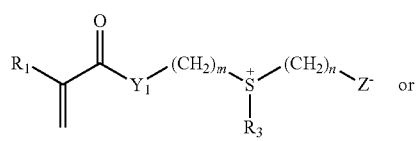

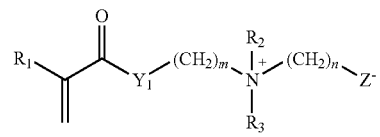

in which:
$R^1$ is hydrogen or methyl,
$R^2$ and $R^3$, which are identical or different, are hydrogen or alkyls having from 1 to 6 carbon atoms,
$Y_1$ is a divalent group of formula —O— or $NR_2$,
$Z^-$ is $SO_3^-$,
m is 2 or 3, and
n is 1-6.

The monomers A are preferably selected from:
sulphopropyldimethylammonioethyl methacrylate (SPE),
sulphoethyldimethylammonioethyl methacrylate,
sulphobutyldimethylammonioethyl methacrylate,
sulphohydroxypropyldimethylammonioethyl methacrylate (SHPE),
sulphopropyldimethylammoniopropylacrylamide,
sulphopropyldimethylammoniopropylmethacrylamide (SPP),
sulphohydroxypropyldimethylammoniopropylmethacrylamide (SHPP),
sulphopropyldimethylammonioethyl acrylate (SPDA),
sulphopropyldiethylammonioethyl methacrylate,
2-vinyl-1-(3-sulphopropyl)pyridinium betaine,
4-vinyl-1-(3-sulphopropyl)pyridinium betaine,
1-vinyl-3-(3-sulphopropyl)imidazolium betaine,
sulphopropylmethyldiallylammonium betaine.

Typically, all or part (and preferably all) the monomers A have one of the following formulae:

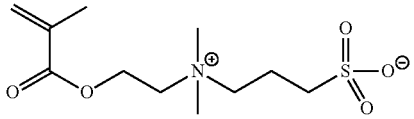
(SPE)

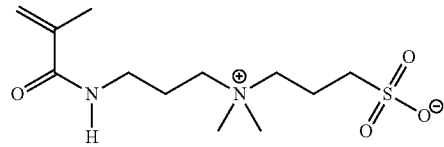
(SPP)

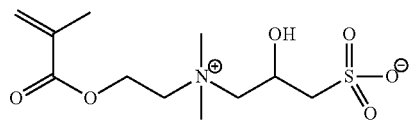
(SHPE)

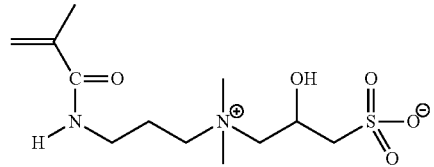
(SHPP)

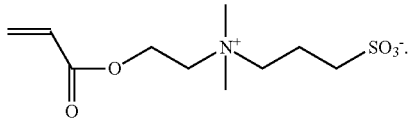
(SPDA)

According to a specific embodiment, the monomers A are SPP and/or SPE monomers.

The nonionic monomers B

The monomers B, typically hydrophilic, are preferably selected from the group consisting in the following monomers and the mixtures thereof:
hydroxyethyl acrylate,
hydroxyethyl methacrylate,
hydroxypropyl acrylate
hydroxypropyl methacrylate,
acrylamide,
methacrylamide,
N-methylolacrylamide,
dimethylacrylamide,
dimethylmethacrylamide, poly(ethylene and/or propylene oxide), if appropriate random or in the block form,
α-methacrylates,
vinyl alcohol
vinylpyrrolidone.

Typically, all or part (and preferably all) the nonionic monomers B are acrylamide (AM).

According to an interesting embodiment, the monomers A are SPP and/or SPE (preferably SPP polymers) and the nonionic monomers B are acrylamide (AM). An especially preferred polymer contains the aforesaid SPP and AM with a AM/SPP molar ratio of between 85/15 and 95/5, typically of about 90/10.

The Crosslinkable Monomers C and the Corresponding Metal Ion Crosslinker

The monomers C, typically hydrophilic, are monomers that contains groups able to induce an inter- or intra- (and preferably at least inter-) crosslinking of the polymers when in contact with a suitable metal ion acting as a crosslinker. In other words, monomers C should carry group acting as ligands of a metal ion. The groups carried out by the monomer C, hereinafter referred as "ligand group" and the metal ion present in the metal ion compound, hereinafter referred as "crosslinking metal ion" are preferably selected with a high metal ligand stability constant between the ligand group and the crosslinking metal ion.

The metal ligand stability constant herein refers to the equilibrium constant for the formation of the crosslinking metal ion-ligand group complex in solution. Its magnitude indicates the strength of the interaction between the crosslinking metal ion and the ligand group. This equilibrium constant (K) may be expressed by the equation:

$$K = \frac{[ML]}{[M][L]}$$

where [ML] is the concentration of the crosslinking metal ion-ligand group complex and [M] and [L] are the respective concentrations of free ligand group and crosslinking metal in solution.

A great number of metal ligand stability constants are known in the literature. Lists of metal ligand stability constants may e.g. be obtained from A. E. Martell's NIST Critically Selected Stability Constants of Metal Complexes.

Stability constants are expressed as the logarithm of the constant K (log K) as defined above:
  values of log K that are less or equal to 1 suggest weak metal ligand interactions with the majority of metal and ligand dissociated in water
  values of log K of more than 1 and of less than 6 indicate medium strength of interaction with most metals in solution being found in their complexed form.
  For example a log K of 6 describes the situation in which 1 free cation in solution may be found for 1 million metal ligand complexes.
  values of log K of between 6 and 20 reflect very strong, or even near irreversible associations of ligand to metal.

As an example, interactions of metal cations with (carboxylic acid)-bearing compounds (citric acid and maleic acid) are reported in the table below, that shows a wide range of metal complex stabilities depending on the selected metal ion.

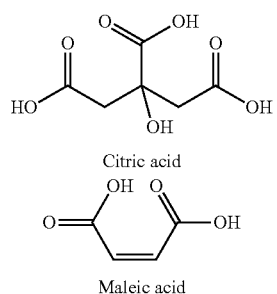

Citric acid

Maleic acid

| Ligand | Ba2+ | Ca2+ | Al3+ | Fe2+ | Fe3+ | Mn | Zn | Sr |
|---|---|---|---|---|---|---|---|---|
| Citric acid | 2.3 | 3.5 | 11.7 | 3.2 | 11.85 | 3.2 | 2.8 | 4.5 |
| Maleic acid | 2.26 | 2.43 | — | — | — | 1.68 | 2.0 | 1.1 |

According to a possible embodiment of the invention, the used crosslinking metal ion and the ligand group present on the polymer are preferably selected from (crosslinking metal ion-ligand group) couples that have a log K of more than 6, preferably of more than 10. Depending on the ionic strength, the pH and the temperature, actual K values may change and it may be useful to make adjust crosslinking metal-ligand to achieve an appropriate log K value.

Another relevant parameter is the kinetic of formation of the crosslinking. It is generally advantageous that the crosslinking formation is sufficiently slow to allow the intimate mixing of the fluid comprising the polymer with the crosslinker before a gelation occurs.

The cation crosslinker is generally added to the fluid. Alternatively, all or part of the cation crosslinker may be inherently present in the fluid and/or in the formation wherein the fluid is introduced.

As a possible embodiment of the invention, monomers C may include carboxylic acid groups as ligand groups (metal ion crosslinkable groups), optionally together with hydroxyl groups to fine tune the interaction with the chosen metal cation. In that scope, the monomers C may especially be selected from ethylenically unsaturated monomers containing carboxylic acid functions. Thus, monomers C may for example be selected from the following monomers and their mixtures:
  Acrylate monomers bearing COOH or COO— groups, including: acrylic acid, methacrylic acid, ethacrylic acid, [alpha]-chloro-acrylic acid, crotonic acid, maleic acid, itaconic acid, citraconic acid, mesaconic acid, glutaconic acid, aconitic acid, fumaric acid; monoesters of C4-C10 (preferably C4-C6) monoethylenically unsaturated dicarboxylic acids, such as monomethyl maleate
  hydroxy containing monomers, for example:
    esters of mono- or bis-carboxylic [alpha],[beta]-ethylenically unsaturated acid with C2-C30 alcanediols, such as 2-hydroxyethylacrylate, 2-hydroxyethylmethacrylate, 2-hydroxyethylethacrylate, 2-hydroxypropylacrylate, 2-hydroxypropylmethacrylate, 3-hydroxypropyl acrylate, 3-hydroxypropyl methacrylate, 3-hydroxybutylacrylate, 3-hydroxybutyl methacrylate, 4-hydroxybutylacrylate, 4-hydroxybutylméthacrylate, 6-hydroxyhexylacrylate, 6-hydroxyhexylmethacrylate, 3-hydroxy-2-ethylhexylacrylate, 3-hydroxy-2-ethylhexylmethacrylate, N-(hydroxymethyl)acrylamide, N-(2-hydroxy propyl)methacrylamide, N-hydroxyethylacrylamide, N-[tris(hydroxyméthyl) methacrylamide, 2-hydroxyethyle acrylate, hydroxypropyle acrylate Depending of the sought effect in terms of rheology, the nature of the metal ion crosslinker has to be adapted to the nature of the used monomers C (alternatively, one may first select the metal ion crosslinker and consequently adapt the monomers C). Mixtures of different ligand group on a monomer C and/or of different monomers C may be used for fine tuning the properties of the polymer.

According to a specific embodiment, monomers C include (and for example are exclusively) acrylic acid monomers. In that case, the metal ion crosslinker (the cation of the metal ion compound leading to the crosslinking of the groups carried by monomers C).may especially be a cation of Fe(III) or Al (III).

According to another possible embodiment, the monomers C include hydroxyl groups and the metal ion crosslinker is preferably a cation of Zr(IV) or Ti(IV).

In some cases borate may be used as crosslinker (this embodiment, that implies a basic pH, should be reserved to the case where Ca2+ ions are substantially absent)

Whatever the exact nature of monomers C, the content of said monomers in the zwitterionic and crosslinkable polymer of the invention is typically of about 1 to 10% by weight, based on the total weight of the polymer.

The zwitterionic and crosslinkable polymer useful according to the invention is preferably used at a concentration above its C* value. The C* value is defined as 1/[η], [η] being the intrinsic viscosity of the polymer expressed here in L/g. Typically, the polymer is used in an oilfield fluid at a content of more than 1 g/L, and generally at a content of not more than 50 g/L, for example between 2 and 20 g/L.

Preparation of the Zwitterionic and Crosslinkable Polymer

The polymer useful according to the invention is prepared by an inverse polymerization process which typically comprises the following stages:
a1) preparation of an inverse emulsion, and
a2) polymerization.

Stage a1) is generally carried out by emulsification of a mixture comprising the aqueous phase comprising the monomers, the external phase and at least one emulsifying agent. The polymerization of step a2) is carried out by bringing together the monomers A, B and C with a compound which generates free radicals and the polymerization is carried out at a temperature between, for example, ambient temperature and 75° C., depending on the initiating system chosen. Step (a2) may e.g. be a random polymerization.

The method may be made of any inert hydrophobic liquid, for example aliphatic and aromatic hydrocarbons and halocarbons, such as toluene, xylene, o-dichlorobenzene, perchloroethylene, hexane, heptane, kerosene, a mineral oil and Isopar M, a substance of isoparaffin type of high purity sold by Exxon Corporation. Likewise, use may be made of any conventional water-in-oil emulsifying agent, such as hexadecyl sodium phthalate, sorbitan monooleate, sorbitan monostearate, mono- and diglycerides, polyethoxylated sorbitol hexaoleate, octyl sodium phthalate or stearyl sodium phthalate. The preferred emulsifying agents are sorbitan monooleate. These emulsifying agents constitute from 0.5% to 10% approximately, preferably from 1% to 5% approximately, by weight of the emulsion.

The ratio of the aqueous phase to the oil phase can vary within wide limits. Generally, the water-in-oil emulsions comprise from 20% to 80% approximately of aqueous phase and thus between 80% and 20% approximately of oil phase, these percentages being based on the total weight of the water-in-oil emulsion. A preferred ratio of the aqueous phase to the oil phase is 70 to 75% approximately of the aqueous phase for 30-25% approximately of the oil phase, percentages based on the total weight of the water-in-oil emulsion.

As was said above, the polymerization is initiated by means of a chemical initiator comprising free radicals. This initiator can be dissolved either in the oil phase or in the aqueous phase, according to its solubility characteristics. Mention may be made, as examples of water-soluble initiators, of 4,4'-azobis[4-cyanovaleric acid] (abbreviated to ACVA), potassium persulphate ($K_2S_2O_8$) and t-butyl hydroperoxide.

Mention may be made, as examples of oil-soluble initiators, of azobisisobutyronitrile (AIBN) or 2,2'-azobis(2,4-dimethylvaleronitrile) (ADVN). The method may also be made of water-soluble initiators of redox type, such as bromate/bisulphite or metabisulphite (for example, $KBrO_3$/$NaHSO_3$ or $KBrO_3$/$Na_2S_2O_5$) or persulphate/bisulphite initiators. The proportion of chemical initiator used depends on several factors. If, thus, it is necessary to maintain a desired reaction rate, the proportion of initiator has to be increased as the reaction temperature falls. By adjusting the reaction temperature and the proportion of initiator, it is possible to carry out the polymerization in a reasonable time and with a reasonable conversion of monomer to polymer, retaining the advantages of a polymerization at low temperatures.

According to a possible embodiment, a polymer useful according to the invention may be prepared by copolymerizing monomers A, B and C. Alternatively, it may be contemplated to start from precursors: for example, a polymer comprising acrylamide as monomer unit B and acrylic acid as monomer unit C may be prepared by (i) copolymerizing monomers A and acrylamides monomomers; and then (ii) partially hydrolysing acrylamide for forming acrylic acid units.

Illustrative and non-limitative examples of the invention are given herein after.

EXAMPLES

Part I: Polymer Synthesis

Example 1

The synthesis is performed in two stages: preparation of an emulsion comprising the monomers and the surfactants, followed by a copolymerization.

Preparation of the Emulsion:

360.42 g of Exxsol D100S (Exxon mobil), 33.97 g of Alkamuls S80 (Solvay), 11.88 g of Alkamuls S20 (Solvay), 7.44 g of Rhodibloc RS (Solvay) and 3.23 g of Hypermer B261 (Croda) are added to a 600 ml glass beaker with magnetic stirring. The mixing is maintained until the solution is clear (Mixture 1). 496.17 g of 50% acrylamide in water, 113.44 g of SPP (Raschig), 29.02 g of acrylic acid sodium salt at 19.74%, 1.82 g of Versene 100E (Dow) and 54.55 g of water are added to a 1000 ml glass beaker with magnetic stirring. The mixing is maintained until the solution is clear (Mixture 2). The mixture 2 is subsequently introduced into the mixture 1 under a magnetic stirring. The stirring is maintained for 10 min and then all the liquid is added to a mixer of rotor/stator type in order to be mixed for 18 min (10000 rpm). The stable emulsion is thus obtained.

Copolymerization:

All the emulsion prepared immediately above is added to a 2 liter jacketed reactor equipped with a nitrogen inlet, a mechanical stirrer, a reflux condenser and a temperature regulation via a thermostatically controlled bath. The temperature of the reaction medium is brought to 30° C. while flushing with nitrogen. 0.36 g of Trigonox 99C75 (Akzo Nobel) is added at 30° C. 4hours after this addition the temperature is increased to 50° C. An additional 0.129 g of Trigonox 99C75 is added during the temperature ramp at 45° C. The temperature of the reaction medium is maintained at 50° C. for 1 h 30. 0.836 g of sodium metabisulfite partially solubilized in 2.057 g of water is subsequently added after 1 hour at 50° C. The combined mixture is collected at ambient temperature.

Example 2

The synthesis is performed in two stages: preparation of an emulsion comprising the monomers and the surfactants, followed by a copolymerization.

Preparation of the Emulsion:

360.42 g of Exxsol D100S (Exxon mobil), 33.97 g of Alkamuls S80 (Solvay), 11.88 g of Alkamuls S20 (Solvay), 7.44 g of Rhodibloc RS (Solvay) and 3.23 g of Hypermer B261 (Croda) are added to a 600 ml glass beaker with magnetic stirring. The mixing is maintained until the solution is clear (Mixture 1). 496.17 g of 50% acrylamide in water, 113.44 g of SPP (Raschig), 74.87 g of acrylic acid sodium salt at 19.74%, 1.82 g of Versene 100E (Dow) and 8.7 g of water are added to a 1000 ml glass beaker with magnetic stirring. The mixing is maintained until the solution is clear (Mixture 2). The mixture 2 is subsequently introduced into the mixture 1 under a magnetic stirring. The stirring is maintained for 10 min and then all the liquid is added to a mixer of rotor/stator type in order to be mixed for 18 min (10000 rpm). The stable emulsion is thus obtained.

Copolymerization:

All the emulsion prepared immediately above is added to a 2 liter jacketed reactor equipped with a nitrogen inlet, a mechanical stirrer, a reflux condenser and a temperature regulation via a thermostatically controlled bath. The temperature of the reaction medium is brought to 30° C. while flushing with nitrogen. 0.36 g of Trigonox 99C75 (Akzo Nobel) is added at 30° C. 4hours after this addition the temperature is increased to 50° C. An additional 0.129 g of Trigonox 99C75 is added during the temperature ramp at 45° C. The temperature of the reaction medium is maintained at 50° C. for 1 h 30. 0.836 g of sodium metabisulfite partially solubilized in 2.057 g of water is subsequently added after 1 hour at 50° C. The combined mixture is collected at ambient temperature.

Example 3

The synthesis is performed in two stages: preparation of an emulsion comprising the monomers and the surfactants, followed by a copolymerization.

Preparation of the Emulsion:

398.86 g of Exxsol D100S (Exxon mobil), 37.59 g of Alkamuls S80 (Solvay), 13.15 g of Alkamuls S20 (Solvay), 8.23 g of Rhodibloc RS (Solvay) and 3.57 g of Hypermer B261 (Croda) are added to a 600 ml glass beaker with magnetic stirring. The mixing is maintained until the solution is clear (Mixture 1). 496.17 g of 50% acrylamide in water, 113.44 g of SPP (Raschig), 157.7 g of acrylic acid sodium salt at 19.74% and 1.82 g of Versene 100E (Dow) are added to a 1000 ml glass beaker with magnetic stirring. The mixing is maintained until the solution is clear (Mixture 2). The mixture 2 is subsequently introduced into the mixture 1 under a magnetic stirring. The stirring is maintained for 10 min and then all the liquid is added to a mixer of rotor/stator type in order to be mixed for 18 min (10000 rpm). The stable emulsion is thus obtained.

Copolymerization:

All the emulsion prepared immediately above is added to a 2 liter jacketed reactor equipped with a nitrogen inlet, a mechanical stirrer, a reflux condenser and a temperature regulation via a thermostatically controlled bath. The temperature of the reaction medium is brought to 30° C. while flushing with nitrogen. 0.36 g of Trigonox 99C75 (Akzo Nobel) is added at 30° C. 4hours after this addition the temperature is increased to 50° C. An additional 0.129 g of Trigonox 99C75 is added during the temperature ramp at 45° C. The temperature of the reaction medium is maintained at 50° C. for 1 h 30. 0.836 g of sodium metabisulfite partially solubilized in 2.057 g of water is subsequently added after 1 hour at 50° C. The combined mixture is collected at ambient temperature.

Example 4

The synthesis is performed in two stages: preparation of an emulsion comprising the monomers and the surfactants, followed by a copolymerization.

Preparation of the Emulsion:

379.56 g of Exxsol D100S (Exxon mobil), 35.77 g of Alkamuls S80 (Solvay), 12.51 g of Alkamuls S20 (Solvay), 7.84 g of Rhodibloc RS (Solvay) and 3.4 g of Hypermer B261 (Croda) are added to a 600 ml glass beaker with magnetic stirring. The mixing is maintained until the solution is clear (Mixture 1). 496.17 g of 50% acrylamide in water, 113.44 g of SPP (Raschig), 120.48 g of maleic acid sodium salt at 19.74% and 1.82 g of Versene 100E (Dow) are added to a 1000 ml glass beaker with magnetic stirring. The mixing is maintained until the solution is clear (Mixture 2). The mixture 2 is subsequently introduced into the mixture 1 under a magnetic stirring. The stirring is maintained for 10 min and then all the liquid is added to a mixer of rotor/stator type in order to be mixed for 18 min (10000 rpm). The stable emulsion is thus obtained.

Copolymerization:

All the emulsion prepared immediately above is added to a 2 liter jacketed reactor equipped with a nitrogen inlet, a mechanical stirrer, a reflux condenser and a temperature regulation via a thermostatically controlled bath. The temperature of the reaction medium is brought to 30° C. while flushing with nitrogen. 0.36 g of Trigonox 99C75 (Akzo Nobel) is added at 30° C. 4hours after this addition the temperature is increased to 50° C. An additional 0.129 g of Trigonox 99C75 is added during the temperature ramp at 45° C. The temperature of the reaction medium is maintained at 50° C. for 1 h 30. 0.836 g of sodium metabisulfite partially solubilized in 2.057 g of water is subsequently added after 1 hour at 50° C. The combined mixture is collected at ambient temperature.

Example 5 (COMPARATIVE)

Non Crosslinkable Copolymer

The synthesis is performed in two stages: preparation of an emulsion comprising the monomers and the surfactants, followed by a copolymerization.

Preparation of the Emulsion:

365.2 g of Exxsol D100S (Exxon mobil), 34.42 g of Alkamuls S80 (Solvay), 12.04 g of Alkamuls S20 (Solvay), 7.54 g of Rhodibloc RS (Solvay) and 3.27 g of Hypermer B261 (Croda) are added to a 600 ml glass beaker with magnetic stirring. The mixing is maintained until the solution is clear (Mixture 1). 496.17 g of 50% acrylamide in water, 113.44 g of SPP (Raschig) and 1.82 g of Versene 100E (Dow) are added to a 1000 ml glass beaker with magnetic stirring. The mixing is maintained until the solution is clear (Mixture 2). The mixture 2 is subsequently introduced into the mixture 1 under a magnetic stirring. The stirring is maintained for 10 min and then all the liquid is added to a mixer of rotor/stator type in order to be mixed for 18 min (10000 rpm). The stable emulsion is thus obtained.

Copolymerization:

All the emulsion prepared immediately above is added to a 2 liter jacketed reactor equipped with a nitrogen inlet, a mechanical stirrer, a reflux condenser and a temperature regulation via a thermostatically controlled bath. The temperature of the reaction medium is brought to 30° C. while flushing with nitrogen. 0.36 g of Trigonox 99C75 (Akzo Nobel) is added at 30° C. 4hours after this addition the temperature is increased to 50° C. An additional 0.129 g of Trigonox 99C75 is added during the temperature ramp at 45° C. The temperature of the reaction medium is maintained at 50° C. for 1 h 30. 0.836 g of sodium metabisulfite partially solubilized in 2.057 g of water is subsequently added after 1 hour at 50° C. The combined mixture is collected at ambient temperature.

Part II-Rheological Performance: Application Test

Example 6

Evaluations of Polymer Gels Made from Purified Polymers

The polymers are purified by precipitation in acetone and dried. The powders obtained are dissolved at 5 g/l with magnetic stirring. After full hydration of the polymer powder crosslinker is added under high speed magnetic stirring.

The polymers have been used in the solutions of variable salinities described in Table 4 below.

TABLE 4

| Reference | Ionic strength (mol/L) | Density | pH |
|---|---|---|---|
| 40% CaCl2 | 15.2 | 1.7 | 3.9 |
| 20% CaCl2 | 6.7 | 1.19 | 5.4 |
| 20% NaCl | 3.9 | 1.15 | 6.5 |

Crosslinkers tested here are Titanium acetylacetonate and iron oxide. Titanium acetyl acetonate is available (commercially from Dorf Ketal under trade name Tyzor AA-75) at 75% active in solution in isopropanol and active $TiO_2$ content is 16.5%.

Iron oxide is solubilised from $FeCl_3$ solid in presence of acetic acid. Solution concentration contains 1% active ferric ions and 1% acetic acid when used in NaCl. For use in CaCl2 brines, ferric or aluminum ions are dissolved in de-ionised water at 1%wt active cation prior use.

Gel rheological properties in 20% NaCl at 95° C. are measured, viscosities at shear rate $0.1\ s^{-1}$ are reported in table below.

| Sample reference | | Crosslinker type | Crosslinker concentration | Viscosity (mPa · s) |
|---|---|---|---|---|
| Example 5 | Ref | Tyzor AA-75 | 0 | 16 |
| Example 5 | Ref | Tyzor AA-75 | 1 g/L | 18 |
| Example 3 | 10% AA | Tyzor AA-75 | 0 | 42 |
| Example 3 | 10% AA | Tyzor AA-75 | 1 g/L | 1200 |
| Example 5 | Ref | Ferric ion | 0 | 16 |
| Example 5 | Ref | Ferric ion | 50 mg/L | 9.3 |
| Example 1 | 2% AA | Ferric ion | 0 | 35 |
| Example 1 | 2% AA | Ferric ion | 50 mg/L | 720 |
| Example 2 | 5% AA | Ferric ion | 0 | 42 |
| Example 2 | 5% AA | Ferric ion | 50 mg/L | 1200 |
| Example 3 | 10% AA | Ferric ion | 0 | 42 |
| Example 3 | 10% AA | Ferric ion | 50 mg/L | 230 |
| Example 4 | 5% MA | Ferric ion | 0 | 7 |
| Example 4 | 5% MA | Ferric ion | 50 mg/L | 500 |
| Example 4 | 5% MA | Ferric ion | 100 mg/L | 2300 |

This series of results demonstrate the ability to crosslink and enhance rheological performance of polymers bearing crosslinkable units in concentrated sodium chloride solution.

Gel rheological properties in 20% CaCl2 at 95° C. are measured; viscosities at shear rate $0.1\ s^{-1}$ are reported in table below.

| Sample reference | | Crosslinker type | Crosslinker concentration | Viscosity (mPa · s) |
|---|---|---|---|---|
| Example 5 | Ref | Tyzor AA-75 | 0 | 15 |
| Example 5 | Ref | Tyzor AA-75 | 1 g/L | 16 |
| Example 2 | 5% AA | Tyzor AA-75 | 0 | 50 |
| Example 2 | 5% AA | Tyzor AA-75 | 1 g/L | 470 |
| Example 3 | 10% AA | Tyzor AA-75 | 0 | 35 |
| Example 3 | 10% AA | Tyzor AA-75 | 1 g/L | 782 |
| Example 4 | 5% MA | Tyzor AA-75 | 0 | 25 |
| Example 4 | 5% MA | Tyzor AA-75 | 1 g/L | 27 |
| Example 5 | Ref | Ferric ion | 0 | 15 |
| Example 5 | Ref | Ferric ion | 50 mg/L | 20 |
| Example 2 | 5% AA | Ferric ion | 0 | 50 |
| Example 2 | 5% AA | Ferric ion | 50 mg/L | 450 |
| Example 3 | 10% AA | Ferric ion | 0 | 18 |
| Example 3 | 10% AA | Ferric ion | 50 mg/L | 200 |
| Example 3 | 10% AA | Ferric ion | 100 mg/L | 2700 |
| Example 4 | 5% MA | Ferric ion | 0 | 25 |
| Example 4 | 5% MA | Ferric ion | 50 mg/L | 76 |
| Example 4 | 5% MA | Ferric ion | 100 mg/L | 1850 |

This series of results illustrate the ability to crosslink and enhance rheological performance of polymers bearing crosslinkable units in concentrated calcium chloride solution.

Example 7

Evaluations of Polymer Gels Made Without Purification of the Polymer

The polymers of Example 3 and 5, have been dispersed directly in CaCl2 40% brine.

2 g/L nonionic surfactant Antarox BL240 (Solvay) has been mixed into the brine before introduction of the polymer in inverse emulsion. The amount necessary to obtain 5 g/l of polymer has been dispersed in the brines. These preparations was, in a first step, stirred vigorously by hand for a few moments and then stirred with a magnetic bar for 15 minutes before crosslinker is added under high shear.

Gel rheological properties in 40% CaCl2Cl at 95° C. are measured; viscosities at shear rate $0.1\ s^{-1}$ are reported in table below.

| Sample reference | Crosslinker type | Crosslinker concentration | Viscosity (mPa · s) |
|---|---|---|---|
| Example 5 Ref | No crosslinker | 0 | 86 |
| Example 5 Ref | Ferric ion | 200 mg/L | 70 |
| Example 5 Ref | Aluminum ion | 100 mg/L | 80 |
| Example 3 10% AA | No crosslinker | 0 | 390 |
| Example 3 10% AA | Ferric ion | 100 mg/L | 690 |
| Example 3 10% AA | Ferric ion | 200 mg/L | 690 |
| Example 3 10% AA | Aluminum ion | 100 mg/L | 1560 |

These results show the dramatic increase of viscosity once appropriate crosslinker is added to the polymer brine solutions directly dispersed from invert emulsion even with extremely high ionic strength brine.

The invention claimed is:

1. A viscosifier for oilfield fluids, comprising:
    at least one zwitterionic polymer, prepared by inverse emulsion polymerization of:
        monomers A, each comprising a betaine group;
        nonionic monomers B; and
        monomers C, each comprising a metal ion-crosslinkable group, wherein monomers C are each selected from the group consisting of acrylate monomers bearing COOH or COO$^-$ groups, monoesters of C4-C10 monoethylenically unsaturated dicarboxylic acids, and mixtures thereof, wherein the polymer comprises from 1 to 10% by weight of monomers C, based on the total weight of the polymer;
    with a molar ratio of the monomers A to the monomers B between 4/96 and 40/60; and
    at least one metal ion compound for crosslinking the metal ion-crosslinkable groups of monomers C.

2. The viscosifier of claim 1, wherein the polymer exhibits an intrinsic viscosity greater than 600 mL/g.

3. The viscosifier of claim 1, wherein the monomers A are monomers selected from the group consisting of the following monomers and their mixtures:
    alkylsulphonates or phosphonates of dialkylammonioalkyl acrylates, dialkylammonioalkyl methacrylates, dialkylammonioalkyl acrylamides, or dialkylammonioalkyl methacrylamides, each comprising a betaine group,
    heterocyclic betaine monomers,
    betaines resulting from the reaction of ethylenically unsaturated anhydrides and dienes, and
    phosphobetaines.

4. The viscosifier of claim 3, wherein the monomers A comprise monomers having one of the following formulae:

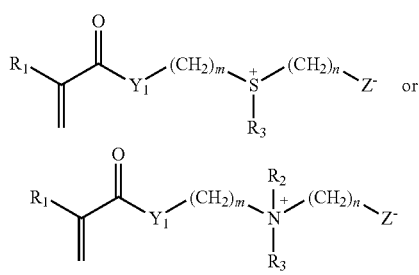

in which:
    $R^1$ is hydrogen or methyl,
    $R^2$ and $R^3$, which are identical or different, are hydrogen or alkyls having from 1 to 6 carbon atoms,
    $Y_1$ is a divalent group of formula —O— or $NR_2$,
    $Z^-$ is $SO_3^-$,
    m is 2 or 3, and
    n is 1-6.

5. The viscosifier of claim 4, wherein the monomers A comprise monomers having one of the following formulae:

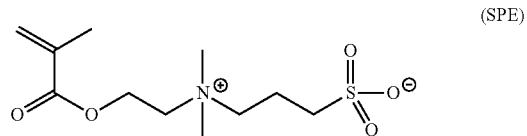
(SPE)

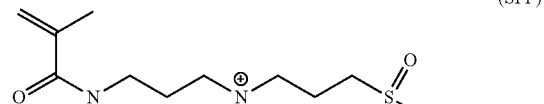
(SPP)

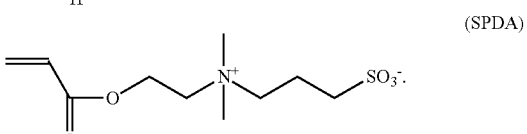
(SPDA)

6. The viscosifier of claim 5, wherein the monomers A are SPP and/or SPE monomers.

7. The viscosifier of claim 1, wherein the monomers B are selected from the group consisting in the following monomers and the mixtures thereof:
    hydroxyethyl acrylate,
    hydroxyethyl methacrylate,
    hydroxypropyl acrylate
    hydroxypropyl methacrylate,
    acrylamide,
    methacrylamide,
    N-methylolacrylamide,
    dimethylacrylamide,
    dimethylmethacrylamide,
    poly(ethylene and/or propylene oxide), if appropriate random or in the block form,
    α-methacrylates,
    vinyl alcohol, and
    vinylpyrrolidone.

8. The viscosifier of claim 7, wherein the monomers B are acrylamide.

9. The viscosifier of claim 1, wherein the monomers A are SPP and/or SPE and the nonionic monomers B are acrylamide, with a AM/SPP molar ratio of between 85/15 and 95/5.

10. The viscosifier of claim 1, wherein the at least one metal ion compound comprises a cation of Fe(III) or Al(III).

11. The viscosifier of claim 1, wherein the at least one metal ion compound comprises a cation of Zr(IV) or Ti(IV), or a borate.

12. The viscosifier of claim 1, wherein monomers C are each selected from the group consisting of acrylic acid, methacrylic acid, ethacrylic acid, [alpha]-chloro-acrylic acid, crotonic acid, maleic acid, itaconic acid, citraconic acid, mesaconic acid, glutaconic acid, aconitic acid, fumaric acid, monomethyl maleate, and mixtures thereof.

13. The viscosifier of claim 1, wherein the monomers A are monomers selected from the group consisting of the following monomers and their mixtures:

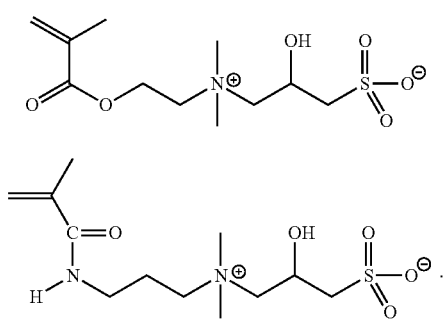

(SHPE)

(SHPP)

14. A process for increasing the viscosity of an oilfield fluid, comprising adding to the fluid:
  at least one zwitterionic polymer, prepared by inverse emulsion polymerization of:
    monomers A, each comprising a betaine group;
    nonionic monomers B; and
    monomers C each comprising a metal ion-crosslinkable group, wherein monomers C are each selected from the group consisting of acrylate monomers bearing COOH or COO⁻ groups, monoesters of C4-C10 monoethylenically unsaturated dicarboxylic acids, and mixtures thereof;
  with a molar ratio of the monomers A to the monomers B between 4/96 and 40/60,
  wherein the polymer comprises from 1 to 10% by weight of monomers C, based on the total weight of the polymer, and
  at least one metal ion compound for crosslinking the metal ion-crosslinkable groups of monomers C.

15. The process of claim 14, wherein the oilfield fluid is a high total dissolved solids fluid.

16. The process of claim 15, wherein the oilfield fluid is a heavy brine.

17. The process of claim 14, wherein the molar ratio of the monomers A to the monomers B is between 7/93 and 30/70.

* * * * *